June 19, 1934.  W. H. ARMACOST  1,963,731
DESUPERHEATER
Filed Jan. 21, 1933  2 Sheets-Sheet 1

W. H. Armacost
INVENTOR
BY O. V. Thiel
ATTORNEY

Patented June 19, 1934

1,963,731

UNITED STATES PATENT OFFICE 1,963,731

DESUPERHEATER

Wilbur H. Armacost, New York, N. Y., assignor to The Superheater Company, New York, N. Y.

Application January 21, 1933, Serial No. 652,806

2 Claims. (Cl. 122—459)

In the art of steam boilers the need arises occasionally to lower the temperature of superheated steam. This may be done by means of desuperheaters, a common type of which conducts the steam through a set of pipes submerged in water.

The present invention relates to devices of this sort.

The most effective conditions for heat transfer with such desuperheaters exist when the water in which the desuperheater elements are immersed is evaporated during the desuperheating and absorbs heat of vaporization rather than merely sensible heat to raise the temperature of the water. A convenient arrangement supplying water of a temperature such that it will be evaporated during desuperheating is the known one of supplying the water for the desuperheater from the boiler at boiler temperature, the steam generated being preferably delivered back to the boiler.

A serious objection to this arrangement is that the inside of the desuperheater shell as well as the outside of the tubular elements through which the steam in the desuperheater circulates are encrusted with solids contained in the boiler water.

One of the objects of the present invention is to obviate this difficulty.

In one form of my invention a so-called deconcentrator is utilized. This is a device described in detail together with its function in United States application 600,864 filed by James A. Powell on March 24, 1932. It is believed unnecessary to describe the function or purpose of such deconcentrators in this place. It will suffice for the present purpose to state that the deconcentrator comprises a drum containing a body of water, the steam to be deconcentrated being delivered into this body of water below its surface and the purified steam being taken off at the top of the deconcentrator chamber. In a preferred arrangement the water in the deconcentrator chamber is fresh feed water on its way to the boiler. The concentration of impurities in this fresh feed water is very much lower than that existing in the boiler itself.

In the form of my invention spoken of I take advantage of the possibilities of this deconcentrator arrangement to furnish the place for the desuperheater elements.

Figure 1:
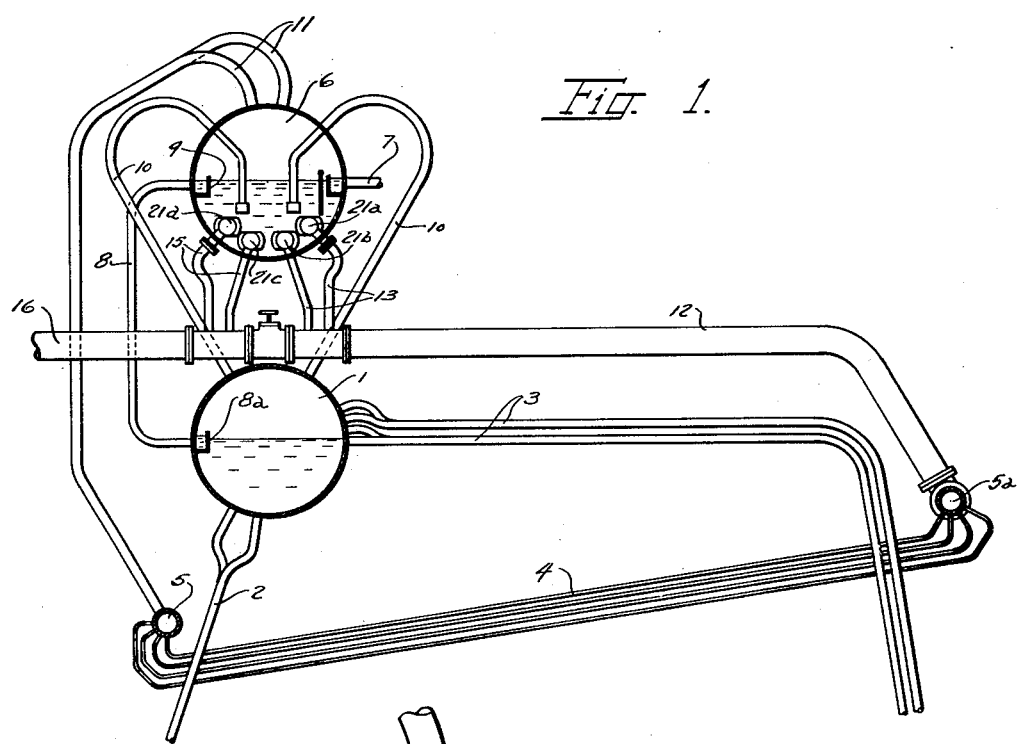
Figure 2:
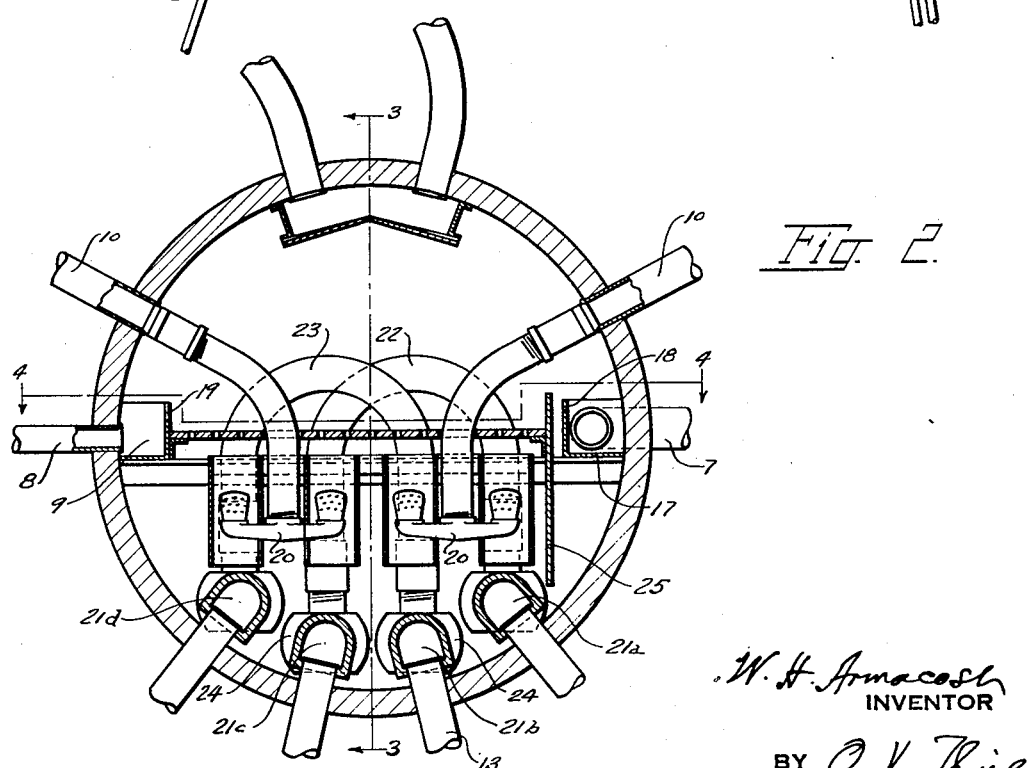
Figure 3:
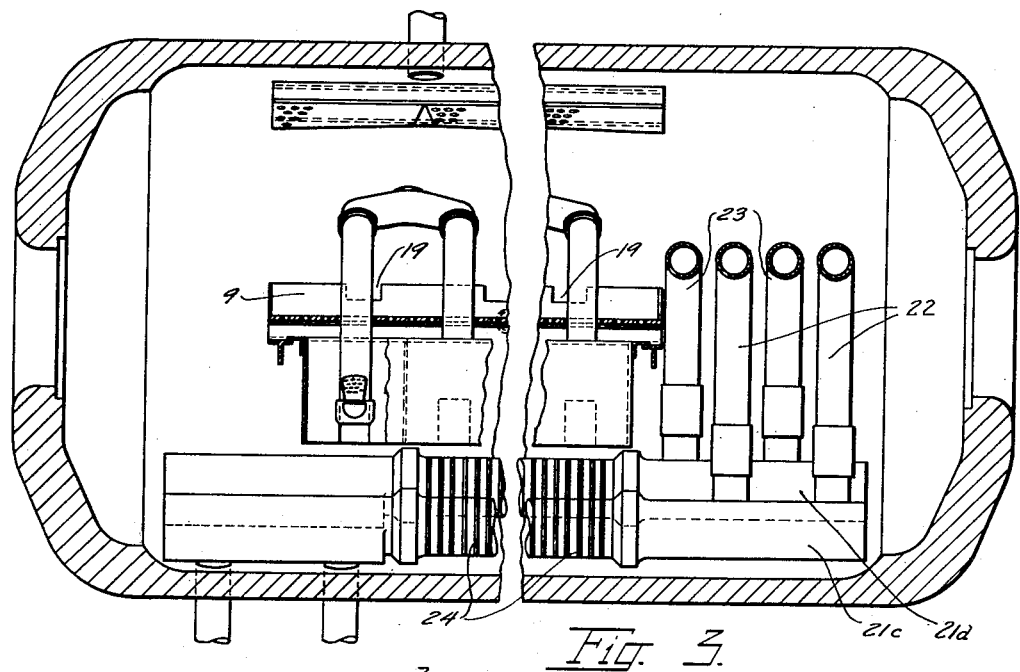
Figure 4:
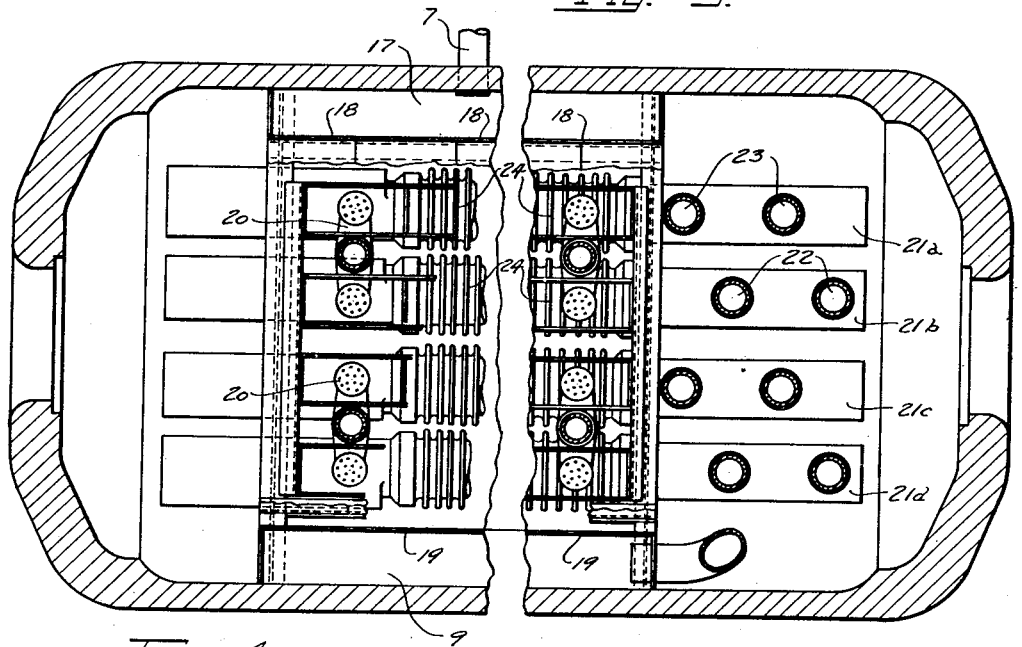

Detailed further objects of the invention will be clear from the following description. The drawings accompanying the description illustrate the preferred form of the invention and in these drawings Fig. 1 is a fragmentary vertical section of a boiler shown by way of example and equipped with a superheater and having associated with it apparatus in accordance with the present invention. Fig. 2 is a transverse section on an enlarged scale of a deconcentrator drum embodying my invention. Fig. 3 is a sectional view on line 3—3 of Fig. 2, and Fig. 4 is a section on line 4—4 of Fig. 2.

Referring first to the assembly view of Fig. 1, the boiler drum appears at 1. 2 are downcomer tubes and 3 are circulator tubes delivering the mixture of steam and water from the boiler tubes to the drum 1. The superheater for the boiler is illustrated at 4 and has an inlet header 5 and an outlet header 5a.

The deconcentrator drum is shown at 6. Water is delivered to it by means of the pipe 7, this water being the feed water for the boiler forced into the drum by means of a pump. The water leaves the drum 6 by means of the pipe 8. While only one pipe 8 is shown, there are preferably a number of these in horizontally alined arrangement. The water level in drum 6 is prevented from falling below a predetermined point by means of a series of longitudinally alined weirs in the upper edge of the trough-like structure 9. This will be described in greater detail in connection with Fig. 2. The lower ends of the pipes 8 open into a water-seal trough 8a in boiler drum 1, from which the water spills into the drum proper.

Steam from drum 1 is delivered by means of pipes 10, of which there may be any desired number, to nozzles opening below the surface of the water in drum 6. This steam passes through the water in the drum and in doing so is purified as more fully described in said application. The purified steam leaves by means of the pipes 11 and is delivered to the inlet header 5 of the superheater. In passing through the tubular elements 4 of the superheater, the steam is superheated and is delivered in this superheated state to the outlet header 5a. From here it flows through pipe 12 and is by means of a pair of pipes 13, delivered to the desuperheater elements 21a, 21b, 21c, and 21d. These deliver it back to the pipes 15 from which it flows to the main 16.

Referring to the enlarged figures, which show the deconcentrator drum in greater detail, the parts referred to above will readily be identified. The delivery pipe 7 discharges water into the trough 17 which is provided with a series of horizontally alined weirs 18. Through these weirs the water flows into the desuperheater drum. A baffle 25 is interposed between the trough 17 and the main body of the water and the water must flow under its lower edge in its course to the outlet.

To reach the outlet the water must flow through a series of weirs 19 in trough 9. These weirs are a little lower than the weirs 18 in the delivery trough. It will be evident that the water level in the drum will not fall below the weirs 19.

The steam to be deconcentrated is delivered to nozzles by means of the pipes 10 as stated above. The nozzles are indicated at 20 and are in this application shown to be of the same form and arranged in the same manner as in application, Serial Number 647,331 filed by the present inventor and James A. Powell on December 15, 1932. They will therefore not be described here in any greater detail than necessary for a general understanding of the action. The steam discharged from the nozzles may in part merely bubble through the water and be discharged at the surface, being however thoroughly washed during such travel, or it may possibly be condensed and re-evaporate other water, or it may in part be condensed in raising the temperature of the water. In any event whatever moisture is carried over from the boiler is left in the body of the water in the deconcentrator. The steam may on the other hand carry other moisture with it as it leaves the surface of the water in the deconcentrator. This water in the deconcentrator, however, is of very much lower concentration than that in the boiler and the whole purpose of the deconcentrator, which is to lower the concentration of solids in the steam, is thus accomplished.

It will be evident from what has been said above that this deconcentrator drum with fresh and clean water at the evaporating temperature furnishes an excellent location for a desuperheater. The most convenient place to locate the desuperheater is in the lower part of the deconcentrator drum and this is the location selected in the example illustrated. In some cases some other location may of course prove preferable.

The desuperheater in the present instance is made up of four elements, 21a, 21b, 21c, and 21d. The two inlet pipes 13 deliver steam respectively to the elements 21a and 21b. 21a is connected at the end opposite the inlet 21c by means of the connecting pipe 22, and 21b is similarly connected by the pipe 23 to the element 21d.

Preferably the desuperheater elements are provided with circumferential fins 24. As seen in Fig. 2, these may be cut off at the top and bottom and extend around the two sides only. Any other means of enhancing the heat transfer rate may be used if desired.

By means of this arrangement, the formation of encrusting deposits on the desuperheater elements and on the walls of the vessel containing the desuperheating water is minimized and in fact practically eliminated. While the deconcentrator drum furnishes an excellent opportunity for putting the desuperheater elements into pure feed water on its way to the boiler, I may in practice where there is no deconcentrator or where for some reason it is undesirable to place the desuperheater elements in the deconcentrator drum, place them in their own drum and carry the feed water through such drum in a manner similar to that hereinabove described.

What I claim is:

1. In apparatus of the class described, and in combination, a boiler, a superheater, a drum, means to conduct feed water for the boiler to the drum and from the drum to the boiler, means to discharge steam from the boiler into the water in the drum, means to conduct steam from the drum to the superheater, and means to conduct steam from the superheater in heat exchanging relation but out of contact with the feed water in the drum.

2. In apparatus of the class described, and in combination, a boiler, a superheater, a drum, means to conduct feed water for the boiler to the drum and from the drum to the boiler, means to prevent water from flowing to the boiler from the drum below a predetermined level in the drum, means to discharge steam from the boiler into the water in the drum, means to conduct steam from the drum to the superheater, desuperheating means in the drum below the point at which said steam is discharged into the water, said desuperheating means comprising a conduit adapted to conduct steam in heat exchanging relation but out of contact with the water, means to convey steam from the superheater to the desuperheating means, means to conduct steam away from the desuperheating means, and a valved by-pass connecting said last named two means.

WILBUR H. ARMACOST.